Nov. 3, 1964 P. J. DE FRIES 3,155,833

BISTABLE TRANSISTOR CIRCUIT WITH FERROELECTIVE MEMORY ELEMENT

Filed Dec. 21, 1959

Inventor:
Paul J. de Fries,
by William D Roberson
His Attorney.

United States Patent Office 3,155,833
Patented Nov. 3, 1964

3,155,833
BISTABLE TRANSISTOR CIRCUIT WITH FERRO-ELECTRIC MEMORY ELEMENT

Paul J. de Fries, Huntsville, Ala., assignor to General Electric Company, a corporation of New York Filed Dec. 21, 1959, Ser. No. 861,037
8 Claims. (Cl. 307—88)

This invention relates to electrical control circuits and more particularly to static or contactless circuits for performing a logical control function in decision making electrical equipment. Circuits of this general category are useful, for example, in automatic and semi-automatic operation of industrial tools and machinery.

The particular control function with which this invention is concerned is identified as the MEMORY function. A MEMORY unit as the name implies is one which "remembers" which of various signal input conditions last existed in its input circuits. Such units are usually capable of being switched between two stable electrical output conditions corresponding to different input signals and of remaining in the prevailing output condition whenever the input signals are removed. One type of MEMORY unit having an output signal which is turned on by a momentary input signal in one of its input channels and turned off by a momentary signal in another of its input channels is disclosed in U.S. Patent 2,856,545, issued on October 4, 1958, to Charles J. Adams and Russell A. Brown and assigned to the assignee of the present invention. Another type of MEMORY unit may, instead of turning its output signal off and on, reverse the output signal polarity with changes in the input signal conditions. MEMORY units constructed in accordance with the present invention may function in either manner.

A characteristic very often found desirable in a MEMORY unit is that it should be capable of remembering its last condition even in the event of total loss and subsequent restoration of power. That is, it should have a "permanent memory." A latching relay is, in essence, an electromechanical PERMANENT MEMORY unit physically latched in its last output condition. A latching relay is undisturbed by interruptions in the power supply because it does not rely upon the power supply for its continued operation. Circuits which provide the advantages of contactless switching, however, are affected by power failure since their electrical characteristics depend to some extent upon the source of power. The MEMORY unit shown and described in the aforesaid patent is in the form of a magnetic amplifier and derives its ability to retain a reliable memory after power failure, that is its permanent memory, from the positive or negative saturation condition which continues to exist in the magnetic core even when power is removed.

In each of these cases, the latching relay and the magnetic amplifier, a physical change in the memory device is responsible for the ability of the device to "remember." In the first case the physical change involves the movement of mechanical members to latch the relay in one or the other condition, while in the second case the physical change involves variations in the magnetic state of the saturable core.

In MEMORY circuits employing transistors or other electronic valves, it is found that the ability of the circuit to remember depends on the state of conductivity of the valve; this state in turn depends on the availability of power. Consequently, in the event of power failure the valves all revert to a non-conducting condition. Upon restoration of power the memory of such circuits is at best amibiguous. It is said that these circuits have no permanent memory.

It is a general object of this invention to provide

MEMORY circuits employing transistors or other electronic valves and endowed with a reliable permanent memory unaffected by interruptions in the power circuit.

Another object of the invention is to provide a symmetrical transistorized PERMANENT MEMORY circuit having a rapid response to input signals.

By way of a brief summary of but one embodiment of the present invention I provide a circuit having two transistors cross-connected as a flip-flop; that is, the collector of each transistor is connected to provide an input signal to the base of the other transistor, so that turning one transistor "on" results in turning the other transistor "off." In combination with the basic circuit, a saturating ferroelectric capacitor is provided connected between the collectors of the two transistors, such that the polarity of the charge on the ferroelectric capacitor depends on which transistor is conducting. In the event of power failure or interruption, the ferroelectric capacitor retains a remanent polarization which assures that when power is restored, current will again flow in the transistor which was last conducting.

Further details of the present invention as well as additional objects and advantages will be comprehended better in connection with the following more detailed description taken together with the accompanying drawings wherein.

Figure 1:
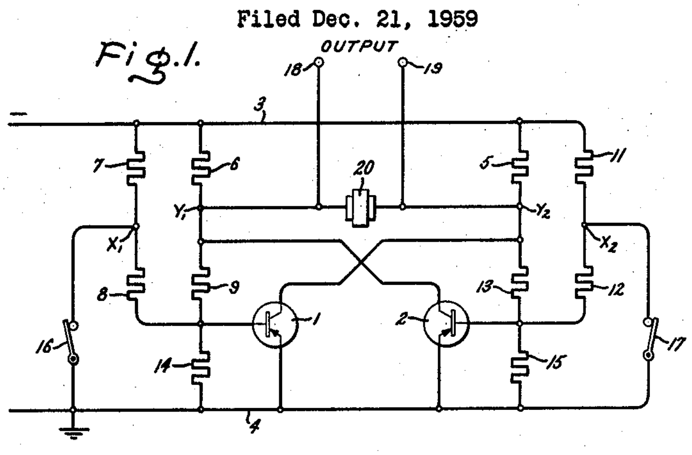
FIG. 1 is a schematic diagram of a PERMANENT MEMORY logic circuit constructed in accordance with this invention.

The circuit of FIG. 1 includes a pair of transistors 1 and 2 connected in parallel across a source of D.C. potential represented by negative power lead 3 and positive power lead 4 through load impedances 5 and 6 respectively. Each of these transistors is adapted to be operated as a switch to gate currents to its respective load impedance. For the purposes of this discussion it will be assumed that a transistor is "on" when it operates as a low impedance device and as "off" when it switches to a high impedance condition. For controlling its conductivity each transistor in this embodiment has associated with it a group of two input terminals X1, Y1, and X2, Y2 respectively. Each transistor provides an output current to its associated load device when no input signals are present at its input terminals or when input signals are present at only one of its input terminals. But when both the input terminals of a given transistor are provided with input signals the transistor switches to its high impedance condition turning off the output currents to its associated load device.

The aforesaid input terminals are connected in respective voltage dividing base channels connected between the base of a transistor and the negative side of the D.C. power source. In the drawing, resistors 7 and 8 and their connections constitute the first voltage-dividing base channel of transistor 1, while the aforementioned load resistor 6 plus the resistor 9 are comprised in its second base channel. In like manner, resistors 11 and 12 form one voltage-dividing base channel of transistor 2, and the load impedance 5 together with resistor 13 compose its second base channel. In the absence of an input signal each one of the two base channels associated with a given one of the two transistors provides a forward bias of that transistor's base electrode, permitting the transistor to be driven into saturation by the D.C. power source represented by power leads 3 and 4. To fix the potentials at the base electrodes and prevent them from "floating," biasing resistors 14 and 15 are connected between the emitter and base of transistors 1 and 2 respectively; these latter resistors function in a well-known manner to render the transistor characteristics relatively insensitive to temperature variations.

The voltage-dividing base channels establish a potential difference across them which tends to permit current flow from the high potential side represented by conductor 4 into the emitter electrode of a given transistor, out through the base electrode, and through either or all of the base channels to the low potential side of the power supply represented by conductor 3. An input signal present, for example, at terminal X1 sufficient to raise the potential at that point above the potential of the base electrode would naturally prevent any base current from flowing in that one channel. However, base currents could still flow in the other channel associated with transistor 1 and these base currents would maintain the transistor in a saturated condition rendering it "on" effectively like a closed switch in series with the load 5. The base currents in transistor 1 cease only when the potentials at each of the input terminals X1 and Y1 are made more positive than the base. When this condition exists, i.e., when the bias on the base reverses, the transistor 1 instantly desaturates cutting off currents to its load 5. No special source of signals is required to place potentials of sufficient magnitude on any of the input terminals. For example, the switches 16 and 17 shown connecting input terminals X1 and X2 respectively to the common positive lead 4 are sufficient, and a signal input condition would correspond to the closing of either of these switches. The number of voltage dividing base channels need not be fixed at two, since the circuit could as well employ three or more base channels connected in the same fashion.

It should be noted that the two transistors are cross-connected with the collector of transistor 1 connected to the input terminal Y2 of transistor 2 and the collector of transistor 2 connected to the input terminal Y1 of transistor 1. This cross-connection, while permitting either transistor to be turned on, prevents them both from being turned on simultaneously. To illustrate why this is so, consider that switches 16 and 17 are closed so that both of the input terminals X1 and X2 are at the potential of line 4 and that transistor 1 is conducting. Because of this the collector of transistor 1 is near positive or ground potential and, hence, so is the input terminal Y2. With both of its input terminals X2 and Y2 at positive potential transistor 2 is non-conducting and its collector is nearer the negative potential of line 3. Consequently, since input terminal Y1 is near negative potential sufficient base current flows through the second base channel of transistor 1 to keep it conducting. If, then, one of the input terminals of transistor 2 is momentarily made negative, as by opening switch 17, transistor 2 immediately begins to conduct because of the bias current which flows in the one base channel. Because of the consequent shift of potential at Y1 to a more positive potential, the base current in transistor 1 ceases to flow and that transistor becomes non-conducting. It is seen therefore that one or the other of the two transistors 1 and 2 may be "on," i.e., conducting, at a given moment, but not both simultaneously. The collector potentials of these transistors will, of course, depend upon which transistor is conducting, and for this purpose output terminals 18 and 19 are shown connected to the collector electrodes. Either or both of these output terminals may be employed to provide an indication of the condition of the circuit.

So much of the circuit as has already been described is not of itself the subject matter of this application. The modular transistor sub-circuit with multiple voltage dividing base channels as well as the cross-connections of such sub-circuits to form a MEMORY unit is described and claimed in my copending patent application for "Logic Circuit," Serial No. 810,116.

This invention contemplates the addition of certain modifications to such a MEMORY circuit or to other bistable circuits, which modifications result in providing the PERMANENT MEMORY function. Without such further modifications the information stored in the circuit is lost upon loss of power. When power reappears, one of the transistors, the "faster" one, will come on first. That is to say that it will be saturated before the other one, and thereby will determine the state of the memory. There is no relationship between this race of the two transistors and their previous state prior to power interruption. The race is decided exclusively by the individual characteristics of the transistors themselves. In order to make the previous state of the memory play a role in what happens upon restoration of the power, it is necessary to have some information stored in the circuit independently of the state of energization of the power supply which is indicative of the information contained in the circuit. That which carries this stored information is customarily known as the storage element.

In the circuit shown in FIG. 1 a single element with unique physical properties is made use of to store the information. The element is a ferroelectric capacitor 20, and it is connected between the collectors of the two transistors. The property of this capacitor representing the information is its remanent polarization also referred to as its remanent charge. Ferroelectric capacitors are constructed like ordinary capacitors with the special feature, however, of having a dielectric between the plates that does not completely lose its polarization after removal of the potential, and which, furthermore, can only be polarized up to a certain maximum charge whereafter the material shows a saturation effect. The dielectric employed may be barium titanate or guanidinum aluminum sulphate hexahydrate, or other materials exhibiting ferroelectric properties.

Figure 2:
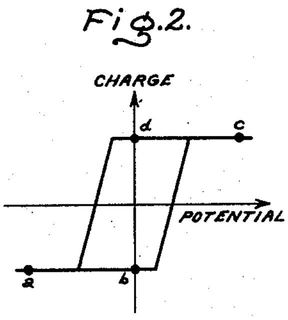
FIG. 2 is an idealized characteristic curve for a ferroelectric capacitor included to clarify certain details of the present invention.

FIG. 2 represents the characteristic curve of a ferroelectric capacitor. It resembles the hysteresis loop of a magnetic material except that the ordinate is expressed in electrical charge, the abscissa in potential. The slope of the characteristic curve at each point represents the capacitance of the ferroelectric capacitor. Hence, when the capaitor is operating on either of the two steep portions of its characteristic curve, it exhibits a substantial value of capacitance. When it operates on the nearly horizontal portions of its curve, however, its capacitance becomes substantially zero; like an electromagnetic material, then, it becomes saturated and can accommodate a substantial range of potentials across it without altering its charge.

The operation of the FIG. 1 circuit may now be considered from the standpoint of how the ferroelectric capacitor influences the circuit and gives it a permanent memory. It may be assumed that both switches 16 and 17 are closed, that the transistor 2 is conducting, and that transistor 1 is non-conducting. The left terminal Y1 of the ferroelectric capacitor is at practically ground potential, whereas the right terminal, Y2, has a negative potential determined by the voltage dropped across resistors 5, 13, and 15. It may be assumed that the ferroelectric capacitor is, with respect to its electrical characteristics, operating at point *a* on FIG. 2. If power to this circuit is interrupted both transistors cease to conduct and the potential across ferroelectric capacitor 20 will drop to zero volts bringing the capacitor to point *b* on its characteristic loop. Now when the power is restored, the two transistors will start the race for reaching saturation first. If the transistor 2, which was conducting before the power was lost, is the faster and reaches the saturated condition first it will drive current through resistor 6, and as long as the potential across the ferroelectric capacitor is changing, it will also try to drive a current through the capacitor from terminal Y1 to Y2 and through resistor 5 to line 3. The capacitive current, $I_C$, may be expressed thus:

$$I_c = C\frac{dV}{dt}$$

where C is the effective capacitance of the ferroelectric capacitor, and $dV/dt$ is the rate of change of the potential across it.

Since the polarity of the voltage V is the same as it was before the power was interrupted, the ferroelectric capacitor will operate on its characteristic curve from point *b* out again into saturation at point *a*. In this region of the characteristic, the effective capacitance is negligibly small and resultingly hardly any capacitive current $I_C$ will flow. For all practical purposes the circuit behaves as if the ferroelectric capacitor and its circuit branch were not present at all in the circuit.

Consider what would be the case if the other transistor 1 were conducting before the power was interrupted. The capacitor will then have substantially a ground potential at terminal Y2 and a negative potential at terminal Y1. The operating point on the hysteresis loop is then *c*. When power is interrupted the potential across the capacitor will again drop to zero, but the point *d* on the characteristic curve will then represent the state of the ferroelectric capacitor.

If power then returns to the circuit, transistor 2 will still be the faster one by virtue of its individual characteristic, and it will again tend to reach the saturated current-carrying state first. In trying to do so, however, it tends to drive a current through load resistor 6 and through the ferroelectric capacitor 20 just as before. But there is a decisive difference now in the state of the ferroelectric capacitor. The ferroelectric capacitor was left at point *d*, that is with the positive polarization at terminal Y2. Transistor 2, in attempting to bring a ground potential to terminal Y1 and a negative potential to terminal Y2, starts to reverse the polarization on the ferroelectric capacitor. In doing this it starts to drive the ferroelectric from point *d* on its characteristic curve down the left slope of the curve toward point *a*. In this region of its characteristic, the capacitor exhibits a rather high capacitance. Therefore an appreciable capacitive current $I_C$ will flow from terminal Y1 to terminal Y2 and through resistor 5 to line 3.

The capacitive current that flows causes an additional voltage drop across resistor 5, so that the effective potential across resistors 13 and 15 is appreciably lowered. This, in turn, lowers the base potential of resistor 2 to a point so close to ground potential that transistor 2 cannot draw enough base current to sustain its collector current. In other words, transistor 2 is forced back into non-conduction, and transistor 1 is free to take over conduction. This is exactly what is desired if the circuit is to have a permanent memory of its previous state. Effectively, the faster transistor 2 produces a positive pulse to its own input circuit thereby stopping itself by its own action. The circuit, being symmetrical, works similarly for either transistor 1 or transistor 2, whichever is the faster one.

One requirement of a circuit of the type shown in FIG. 1 is that when power is restored in the circuit after an interruption and if the faster transistor was not the last to conduct enough capacitive current, $I_C$, must flow to ensure that the base potential of the faster of the two transistors is sufficiently reduced to turn that transistor off, or a least to delay its saturation sufficiently so that the other transistor will reach saturation first. In the event that the ferroelectric capacitor is incapable of supplying sufficient current for this purpose, it may be aided in its function by a modification of the circuit such as is shown in FIG. 3.

Figure 3:
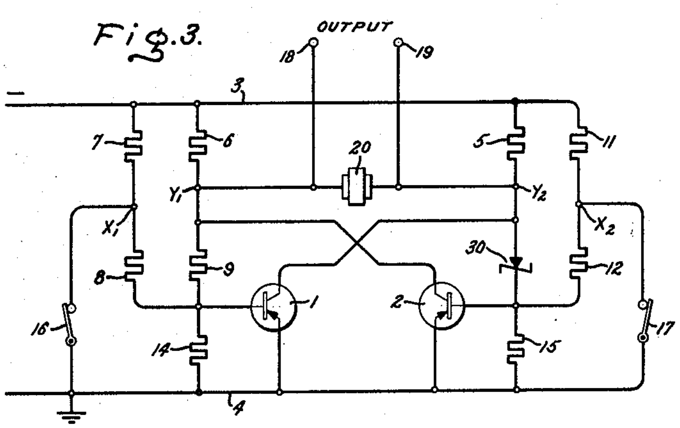
FIGS. 3 and 4 are circuit diagrams of further embodiments of the invention including certain refinements.

FIG. 3 is in all respects identical to FIG. 1, except that the Zener diode 30 replaces the voltage-dividing resistor 13 of the first figure. The other circuit components are numbered the same as their counterparts in FIG. 1 to simplify the discussion.

Zener diodes, also known as saturation or avalanche diodes, exhibit a negative saturation characteristic in that a reverse potential across the device produces very little current through the diode until the potential reaches the saturation voltage of the diode. Beyond this saturation point, a slight increment in reverse voltage produces a large increment in reverse current, and the diode acts then as low impedance path. The Zener diode 30 should be chosen such that under normal conditions with transistor 2 conducting, the potential across the Zener diode is slightly higher than its saturation voltage. Hence, the base current of transistor 2 can flow freely out of its base through the Zener diode and through load resistor 5 to line 3.

The only condition of the circuit which need be considered is the one in which, upon restoration of circuit power after an interruption, the previously non-conducting transistor tends to saturate first. For if the previously conducting transistor tends to saturate first, the ferroelectric capacitor 20 may be regarded as not in the circuit at all. But if the wrong transistor tends to saturate first, the effect of the ferroelectric capacitor is to pass a current pulse which inhibits the wrong transistor from conducting until the right one can saturate and positively prevent the other one from conducting. When a pulse of capacitive current $I_C$ is passed through the ferroelectric capacitor, the potential drop across resistor 5 decreases the potential across the Zener diode 30 to a point below its saturation voltage. The diode then snaps out of conduction into its blocking state, and cuts off the base current of transistor 2 most effectively.

Actually another effect is present when the Zener diode is connected in the circuit. Since each semiconductor junction possesses a small capacitance, the equivalent capacitor of the Zener diode is charged up while the base current is flowing. When the diode begins to desaturate and assumes its high impedance condition as a consequence of the capacitive current $I_C$, the equivalent capacitor of the Zener diode must discharge. But the discharge which takes place is directly into the base of transistor 2 and, as a consequence, the base current in transistor 2 is not only reduced drastically but is even reversed for a few microseconds. This discharge process actually sweeps the carriers away from the diode junction rendering the diode thereby nonconductive. This, of course, has a very positive effect on ensuring that transistor 1, the previously conducting transistor, returns to its earlier state. In practice, a Zener diode would be selected with a rather high equivalent capacity, or to express it in other terms, a slow low frequency Zener diode would be employed.

The way the circuit of FIG. 3 operates depends upon transistor 2 being the faster one of the two. To make certain that this is the case, one might select different types of transistors of which one type definitely is known to have faster characteristics than the other. Or if the same type of transistor is employed for both transistors, these can be tested and sorted according to their speed of response. Then the faster of the two transistors would be associated with the Zener diode in the circuit.

Alternatively, circuit modifications may be made which would have the effect of ensuring that the transistor associated with the Zener diode has the faster response. Hence even if transistor 2 were intrinsically slower in response, the circuit would actually speed its response and make it act faster than transistor 1.

Figure 4:
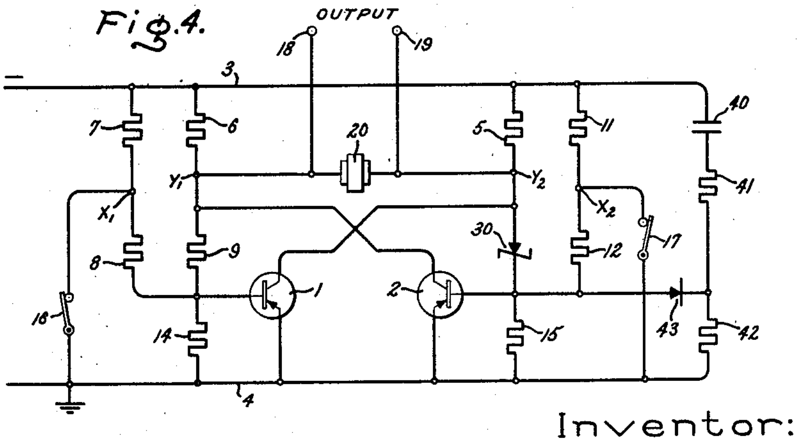

FIG. 4 which is otherwise identical to FIG. 3 and is similarly numbered, shows additional circuitry intended to speed the response of transistor 2. The additional circuitry includes a capacitor 40 connected in series with resistors 41 and 42 from line 3 to line 4, and a diode 43 connecting the base of transistor 2 to the connection point between resistors 41 and 42.

Remembering that only that case need be considered in which the faster of the two transistors was nonconducting when the power was interrupted, and assuming that transistor 1 was in fact the last to conduct, when power is restored to lines 3 and 4, capacitor 40 will draw a rather large charging current through the emitter and base of transistor 2, through the diode 43 and resistor 41. This charging current draws a very heavy base current through transistor 2, and will turn it fully on. The effect is, however, only momentary since the capacitor 40 becomes fully charged within a few microseconds. After that the rest of the circuit including ferroelectric capacitor 20 will function as described before in connection with FIG. 3. One thing however is definitely ensured, and that is that transistor 2 is the first to attempt to conduct even though transistor 1 may possibly have been intrinsically faster. Consequently, as in the previous example, transistor 2 produces the pulse of current to turn itself off and permits transistor 1 to conduct.

In the event the transistor 2 was previously conducting, it will simply turn on first and the ferroelectric capacitor, having a charge of a different polarity on it, will indicate its complete agreement with the condition of the circuit by producing no current pulse to transistor 1. The resistor 41 serves only a current limiting purpose, and in conjunction with capacitor 40 determines the length of the current pulse through the base of transistor 2. The resistor 42 provide a discharge path for the capacitor 40 when power goes off, and the diode 43 decouples the additional circuitry from the main part of the permanent memory circuit.

While I have selected certain embodiments to describe the principles of this invention, it should be well understood that these have been illustrative in nature and that other variations than those specifically described will doubtless occur to those skilled in the art to which this invention pertains. The appended claims are therefore intended to apply to all such variations as fall within the true spirit and scope of this invention.

What I claim as new and desire to secure by Letters Patent of the United States is:

1. An electrical circuit comprising: a pair of transistors each having an emitter, a collector, and a base; a pair of bias circuits each connected to a separate one of said transistor bases, the collector of each transistor being connected to the bias circuit of the other transistor to define a bistable circuit such that either of said transistors may be in a high conduction state but not both simultaneously; a ferroelectric capacitor connected across the collectors of said transistors and connected to said bias circuits to acquire a charge the polarity of which depends on the relative conductances of said transistors and to retain a remanent charge in the event of interruption of power to said circuit, whereby a shift in the high conduction state from one transistor to the other occasions a flow of capacitive current in said ferroelectric capacitor; and impedance means connected to said bias circuits responsive to said capacitive current upon restoration of power to the circuit to inhibit conduction of the transistor not highly conducting before interruption of power.

2. A PERMANENT MEMORY electrical circuit comprising: a source of direct current potential; a pair of transistors each having an emitter, a collector, and a base, each of said transistors being connected across said source; a pair of input signal base circuits each connected to respective ones of said transistor bases for selectively controlling the conduction of said transistors; the collector of each transistor being connected to the base circuit of the other transistor such that either of transistors may be highly conducting but not both simultaneously; a ferroelectric capacitor connected across the collectors of said transistors and connected to said base circuits to acquire a charge the polarity of which depends on the relative conductances of said transistors and to retain a remanent charge in the event of interruption of power from said source, whereby any tendency of the one transistor which was not highly conducting before interruption of power from said source to become highly conducting upon restoration of power causes a flow of capacitive current through said ferroelectric capacitor into the base circuit of said one transistor, the input signal base circuit of said one transistor responding to said capacitive current to bias it toward cut-off, thereby permitting the other of said transistors to become highly conducting.

3. A PERMANENT MEMORY electrical circuit comprising: a source of direct current potential; a pair of transistors each having an emitter, a collector, and a base, each of said transistors being connected across said source; a pair of load elements each in series with a respective one of said transistors on the collector side thereof; a pair of control circuits each connected to a respective one of said transistor bases for selectively controlling the conduction of said transistors; the collector of each transistor being connected to the control circuit of the other transistor such that one or the other of said transistors may be in a high conduction state but not both simultaneously; a ferroelectric capacitor connected across the collectors of said transistors in circuit with said load elements to acquire a charge the polarity of which depends upon the relative conductances of said transistors and to retain a remanent charge in the event of interruption of power from said source, whereby any tendency of the one transistor which was not in its high conduction state before interruption of said power from said source to enter its high conduction state upon restoration of power causes a flow of capacitive current through said ferroelectric capacitor and through one of said load elements, the control circuit of said one transistor responding to said capacitive current through said one load element to bias said one transistor toward cut-off, thereby permitting the other of said transistors to enter its high conduction state.

4. A PERMANENT MEMORY bistable electrical circuit comprising: a source of direct current potential; a pair of transistors energized from said source each having an emitter, a collector, and a base; a pair of control circuits each comprising a plurality of voltage-dividing impedance elements connected in series between a respective one of said bases and one side of said source; the collector of each transistor being connected to an intermediate terminal point between adjacent series-connected impedance elements in the control circuit associated with the other transistor, such that either of said transistors may be in a high conduction state but not both simultaneously; one of said transistors having a faster electrical characteristic which tends to cause it to enter its high conduction state more quickly than the other upon restoration of power after an interruption; and means for returning the slower of said transistors to its high conduction state upon restoration of power to said circuit following an interruption which occurs when said slower transistor is in its high conduction state, said last-named means including a ferroelectric capacitor connected between the collectors of said transistors at said intermediate terminal points.

5. A PERMANENT MEMORY bistable electrical circuit comprising: a source of direct current potential; a pair of transistors energized from said source each having an emitter, a collector, and a base; a pair of control circuits each comprising a plurality of voltage-dividing impedance elements connected in series between a respective one of said bases and one side of said source; the collector of each transistor being connected to an intermediate terminal point between adjacent series-connected impedance elements in the control circuit associated with the other transistor such that either of said transistors may be in a high conduction state but not both simultaneously; one of said transistors having a faster electrical characteristic which tends to cause it to enter its high conduction state more quickly than the other upon restoration of power after an interruption; and means for returning the slower of said transistors to its high conduction state upon restoration of power to said circuit following an interruption which occurs when said slower transistor is in its high conduction state, said last-named means including a ferroelectric capacitor connected between the collectors of said transistors at said intermediate terminal points, and a Zener diode connected in the control circuit of said faster transistor between the base electrode and the intermediate terminal point associated therewith.

6. A PERMANENT MEMORY bistable electrical circuit comprising: a source of direct current potential; a pair of transistors energized from said source each having an emitter, a collector, and a base; a pair of control circuits each comprising a plurality of voltage-dividing impedance elements connected in series between a respective one of said bases and one side of said source; the collector of each transistor being connected to an intermediate terminal point between adjacent series-connected impedance elements in the control circuit associated with the other transistor, such that either of said transistors may be in a high conduction state but not both simultaneously; means including a capacitor connected between the base of one of said transistors and said one side of said source to cause said one transistor to enter its high conduction state more quickly than the other upon restoration of power after an interruption; and means for returning the other of said transistors to its high conduction state upon restoration of power to said circuit following an interruption which occurs when said other transistor is in its high conduction state including a ferroelectric capacitor connected between the collectors of said transistors at said intermediate terminal points, and a Zener diode connected in the control circuit of said one transistor between the base electrode and the intermediate terminal point associated therewith.

7. An electrical circuit comprising, a pair of electronic valves each having two main electrodes and a control electrode, a pair of control circuits each connected to a separate one of said control electrodes for selectively controlling the conduction of said valves, one main electrode of each valve being connected to the control circuit associated with the other valve such that either of the valves may be highly conducting but not both simultaneously, a ferroelectric capacitor connected across said one main electrode and connected to said control circuits to acquire a charge the polarity of which depends upon the relative conductance of said valves and to retain a remanent charge in the event of interruption of power to said circuit, said ferroelectric capacitor being connected such that conduction of one valve after restoration of power which was not highly conductive before power interruption produces a capacitive current which flows through the control circuit associated with said one valve, the control circuit associated with said one valve being effective in response to said capacitive current to render said one valve non-conducting to thereby permit the other valve to become highly conductive.

8. A PERMANENT MEMORY bi-stable electrical circuit comprising, a source of direct current potential, a pair of electronic valves energized from said source, each valve including a pair of main electrodes and a control electrode, a pair of control circuits each comprising a plurality of voltage dividing impedance elements connected in series between a respective one of said control electrodes and one side of said source, one main electrode of each valve being connected to an intermediate terminal point between adjacent series connected impedance elements in the control circuit associated with the other valve, such that either of said valves may be in a high conduction state but not both simultaneously, one of said valves having a faster electrical characteristic which tends to cause it to enter its high conduction state more quickly than the other upon restoration of power after an interruption, and a ferroelectric capacitor connected between the said one main electrode and said intermediate terminal points to acquire a charge having polarity dependent upon which valve is conductive and to retain a remanent charge in the event of interruption of power, said capacitor being connected such that capacitive current flows through one of said control circuits in response to conduction of a valve not previously conducting before interruption of power, said one control circuit being effective in response to capacitive current therethrough to render said one valve non-conductive.

References Cited by the Examiner

UNITED STATES PATENTS

| | | | |
|---|---|---|---|
| 2,854,590 | 9/58 | Wolfe | 307—88 |
| 2,913,708 | 11/59 | Paull | 307—88 |
| 2,937,285 | 5/60 | Olsen | 307—88 |
| 2,954,532 | 9/60 | Pentecost | 331—144 |
| 2,995,735 | 8/61 | Frank | 340—174 |

IRVING L. SRAGOW, *Primary Examiner.*

EVERETT R. REYNOLDS, JOHN F. BURNS, *Examiners.*